(12) United States Patent
Tanaka et al.

(10) Patent No.: US 7,394,374 B2
(45) Date of Patent: Jul. 1, 2008

(54) INSTALLATION CONSTRUCTION OF RADIO COMMUNICATION MODULE ON VEHICULAR LICENSE PLATE

(75) Inventors: Yukiomi Tanaka, Takahama (JP); Shingo Yoshida, Ichinomiya (JP)

(73) Assignee: Denso Corporation, Kariya (JP)

( * ) Notice: Subject to any disclaimer, the term of this patent is extended or adjusted under 35 U.S.C. 154(b) by 231 days.

(21) Appl. No.: 11/220,347

(22) Filed: Sep. 6, 2005

(65) Prior Publication Data

US 2006/0049945 A1     Mar. 9, 2006

(30) Foreign Application Priority Data

Sep. 7, 2004   (JP) .............................. 2004-259687

(51) Int. Cl.
*G08B 13/14*  (2006.01)
(52) U.S. Cl. .................. 340/572.1; 340/693.5; 340/933
(58) Field of Classification Search .............. 340/572.1, 340/693.5, 933, 539.1; 40/209, 200, 204; 362/473, 497; 343/713; 235/384
See application file for complete search history.

(56) References Cited

U.S. PATENT DOCUMENTS

| | | | | |
|---|---|---|---|---|
| 6,025,784 A | * | 2/2000 | Mish | 340/693.5 |
| 6,179,103 B1 | * | 1/2001 | Meyer | 191/12 R |
| 6,381,886 B1 | * | 5/2002 | Chou | 40/209 |
| 6,628,209 B1 | * | 9/2003 | Rother | 340/933 |
| 6,873,297 B1 | * | 3/2005 | Posluszny | 343/711 |
| 7,195,405 B2 | * | 3/2007 | Son | 396/427 |

FOREIGN PATENT DOCUMENTS

| | | |
|---|---|---|
| JP | 2001-118099 | 4/2001 |
| JP | 2001-119175 | 4/2001 |

* cited by examiner

*Primary Examiner*—Toan N. Pham
(74) *Attorney, Agent, or Firm*—Harness, Dickey & Pierce, PLC (57) ABSTRACT

An installation construction of a radio communication module on a license plate of a vehicle includes the followings: the radio communication module provided with a housing having an engaging portion and a fixing hole; an engagement of the engaging portion with a rim of the license plate; and a screw-fastening of a bolt inserted in the fixing hole to screw-fasten the radio communication module together with the license plate to the vehicle.

18 Claims, 8 Drawing Sheets

INSTALLATION CONSTRUCTION OF RADIO COMMUNICATION MODULE ON VEHICULAR LICENSE PLATE

CROSS REFERENCE TO RELATED APPLICATION

This application is based upon and claims the benefit of priority of Japanese Patent Application No. 2004-259687 filed on Sep. 7, 2004, the content of which is incorporated herein by reference.

FIELD OF THE INVENTION

The present invention relates to an installation construction of a radio communication module on a vehicular license plate.

BACKGROUND OF THE INVENTION

Currently, a system (so-called an electric license plate system) is under development to transmit and receive various data between a radio communication module fixed on a vehicular license plate and outer apparatuses (road-side units) installed on sides of roads for a registration management of vehicles, a traffic control and the like.

As a method to fix the radio communication module on the license plate, JP-2001-119175-A discloses, for example, that a casing, which is for installing the radio communication module on the license plate, is fixed on the license plate by welding and the like, and the radio communication module is installed in the casing.

However, the installation constriction of the radio communication module according to JP-2001-119175-A has a relatively poor workability in fixing the radio communication module on the license plate. The installation construction requires works such as welding to fix the casing on the license plate. Further, when it is necessary to detach the radio communication module from the license plate for a data maintenance, repair of failure and so on, the radio communication module cannot be easily detached from the license plate, so that the installation construction includes an issue in a viewpoint of operation and popularization of the products.

Current vehicular license plate is provided with two installation holes to fix itself on a vehicle. The license plate is screw-fastened to the vehicle by bolts inserted into the installation holes.

It is considered to fix the radio communication module on the license plate with use of these bolts. However, in a case that the radio communication module is screw-fastened by a pair of the bolts, an installation member and the like hides a part of an indication face of the license plate. In another case that the radio communication module is screw-fastened by a single bolt, the radio communication module may rotatably slide and is not stably fixed on the license plate.

SUMMARY OF THE INVENTION

The present invention is achieved to solve the above-described issues, and has an object to provide an installation construction of a radio communication module on a vehicular license plate, by which the radio communication module can be stably fixed on the license plate by only a single bolt.

The installation construction of the radio communication module on a vehicular license plate includes the followings: the radio communication module provided with a housing having an engaging portion and a fixing hole; an engagement of the engaging portion with a rim of the license plate; and a screw-fastening of a bolt inserted in the fixing hole to screw-fasten the radio communication module together with the license plate to the vehicle.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

First Embodiment

Figure 1A:
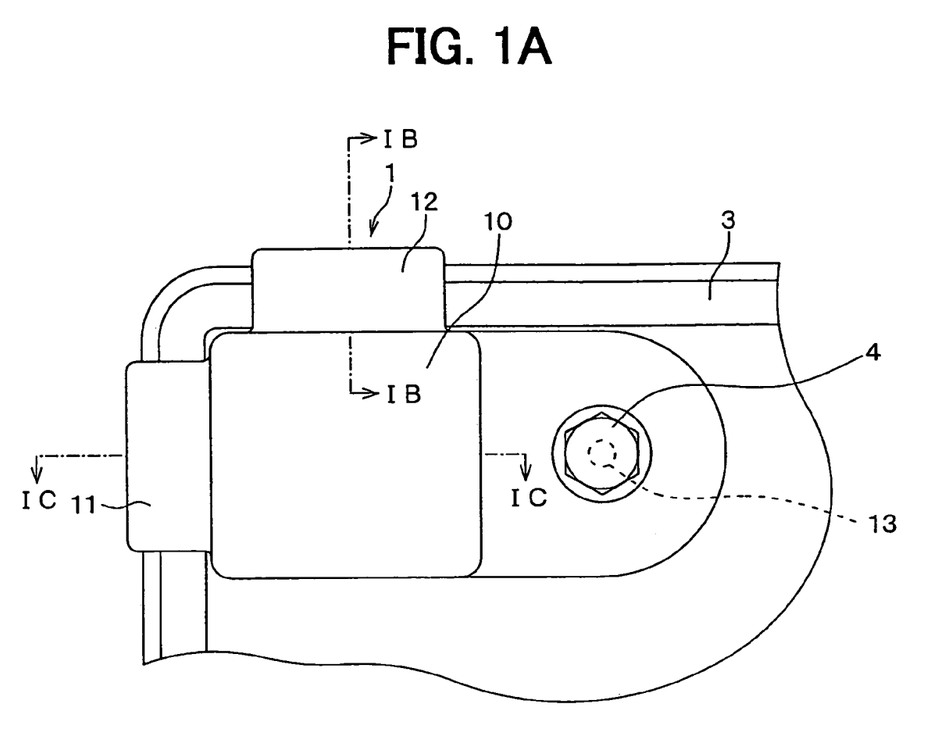
FIG. 1A is a front view showing a fixing state of a radio communication module according to a first embodiment of the present invention.
Figure 1B:
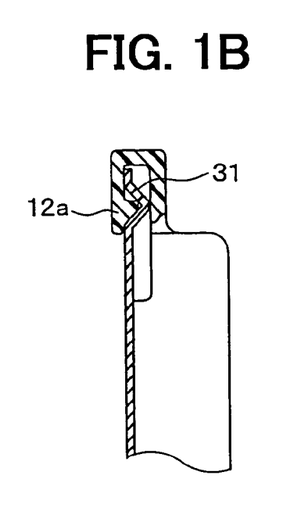
FIG. 1B is a cross-sectional view of the fixing state of the radio communication module of FIG. 1A taken along the line IB-IB.
Figure 1C:
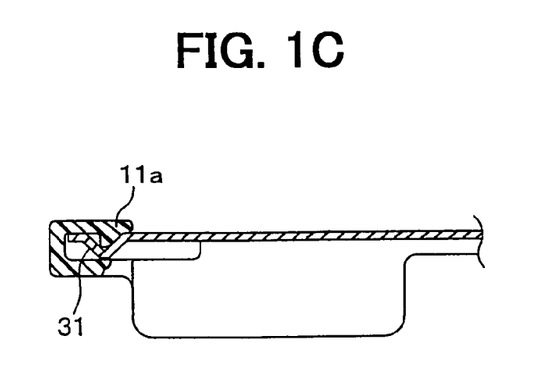
FIG. 1C is a cross-sectional view showing the fixing state of the radio communication module of FIG. 1A taken along the line IC-IC.

FIGS. 1A to 1C depict a state that a radio communication module 1 according to a first embodiment of the present invention is fixed on a license plate 3 of a vehicle.

The radio communication module 1 is provided with a housing 10 made of resinous material, which installs a main body (not shown) of the radio communication module 1 therein. The main body has an IC chip (not shown) that stores information of vehicular specification, a license plate number and so on. The main unit transmits and receives respective data to and from outer apparatuses (road-side units) installed on a side of roads by radio communication.

The housing 10 of the radio communication module 1 has a first engaging portion 11, which is to be engaged with a left end portion of the license plate 3, a second engaging portion 12, which is to be engaged with an upper end portion of the license plate 3, and a fixing hole 13 through which a bolt 4 is inserted to fix the license plate 3 and the radio communication module 1 on the vehicle.

The first engaging portion 11 is provided at a left side of the fixing hole 13 so as to be engaged with the left end portion of the license plate 3 when the housing 10 is fixed on the license plate 3. The second engaging portion 12 is provided at an upper side of the fixing hole 13 so as to be engaged with the upper end portion of the license plate 3 when the housing 10 is fixed on the license plate 3. The second engaging portion 12 also serves a support of a weight of the radio communication module 1 fixed on the license plate 3.

Figure 2A:
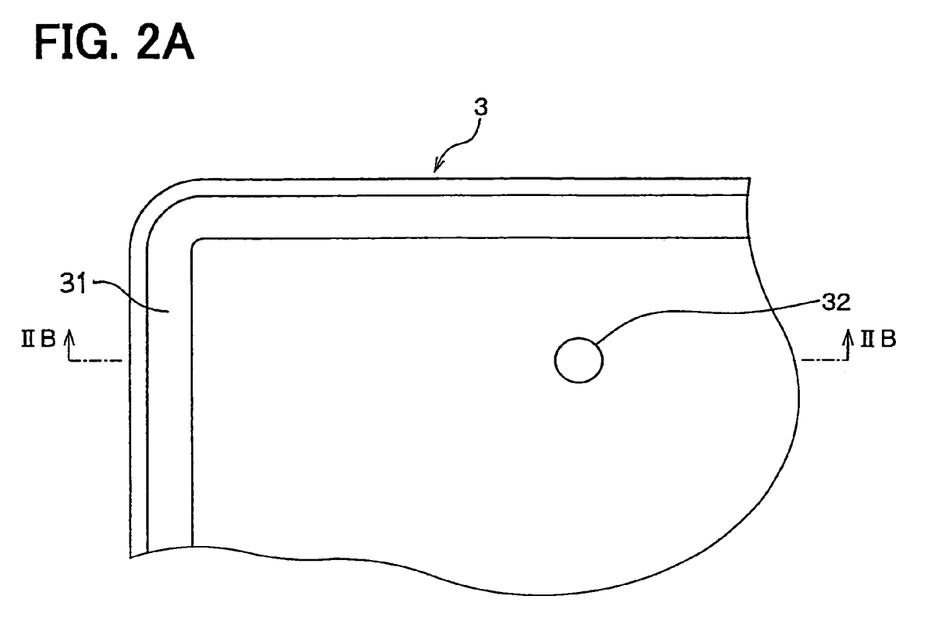
FIG. 2A is a front view showing the license plate in FIG. 1A.
Figure 2B:
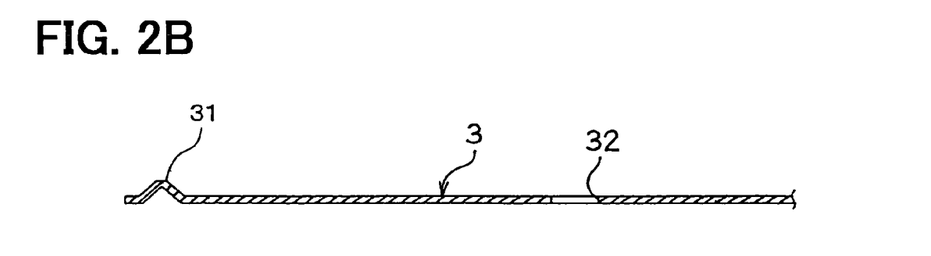
FIG. 2B is a cross-sectional view of the license plate of FIG. 2A taken along the line IIB-IIB.

FIGS. 2A and 2B depict a front view and a cross-sectional view of a top-left portion of the license plate 3. As shown in FIG. 2A, the license plate 3 has an installation hole 32 through which the bolt 4 is inserted to fix the license plate 3 on the vehicle. The license plate 3 has two installation holes 32 at the top-left portion and a top-right portion thereof. Further, as shown in FIG. 2B, the license plate 3 has a ridge 31 along a rim portion thereof that protrudes frontward to reinforce the license plate 3.

As shown in FIGS. 1B and 1C, the first and second engaging portions 11, 12 have approximately U-shaped sectional shapes to pinch the ridge 31 of the license plate 3 therein.

Further, the first and second engaging portions 11, 12 are respectively provided with engaging hooks 11a, 12a at leading ends thereof. The engaging hooks 11a, 12a respectively have so-called snap-and-fit shapes. That is, the engaging hooks 11a, 12a are chamfered at leading ends thereof to insert the end portions of the license plate 3 into the engaging portions 11, 12 in installing the radio communication module 1 on the license plate 3. The engaging hooks 11a, 12a also have hooked sectional shapes to restrict the license plate 3 from being detached from the engaging portions 11, 12. These engaging hooks 11a, 12a respectively engage with rear sides of the ridge 31 with use of elasticity thereof.

Figure 3A:
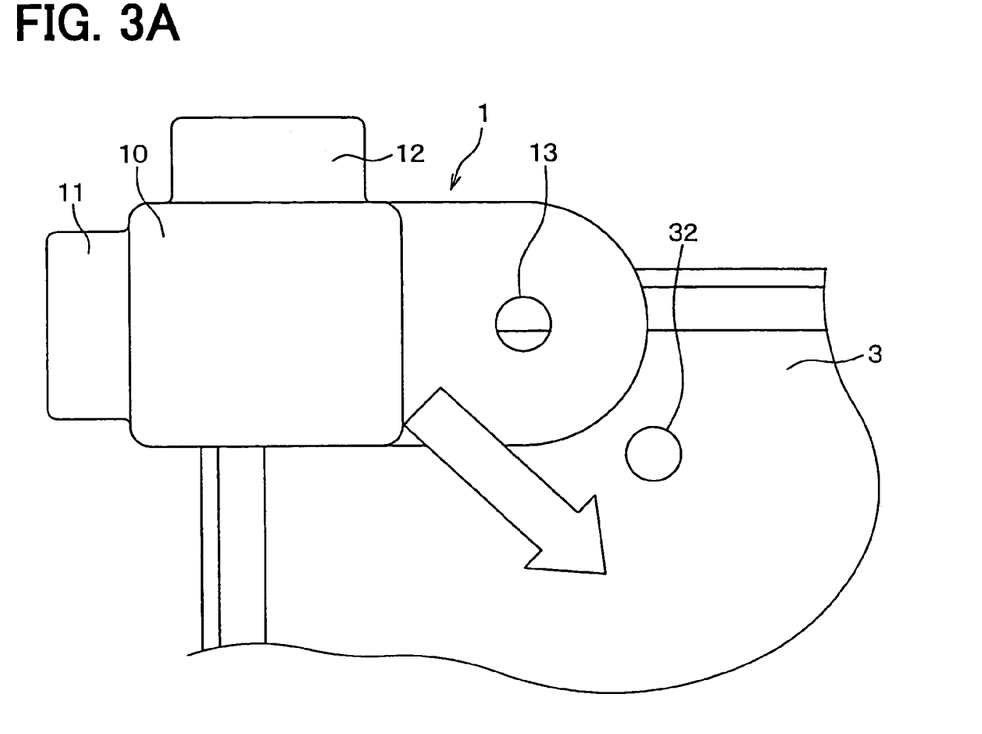
FIG. 3A is a front view showing a state before an installation of the radio communication module on the license plate.
Figure 3B:
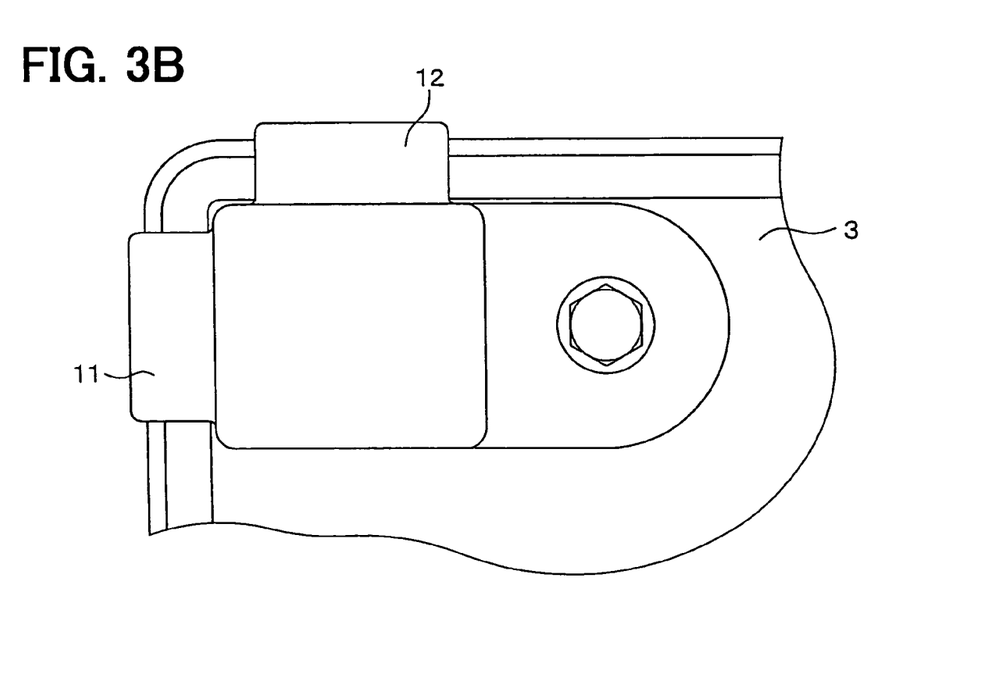
FIG. 3B is a front view showing a state after the installation of the radio communication module on the license plate.
Figure 4A:
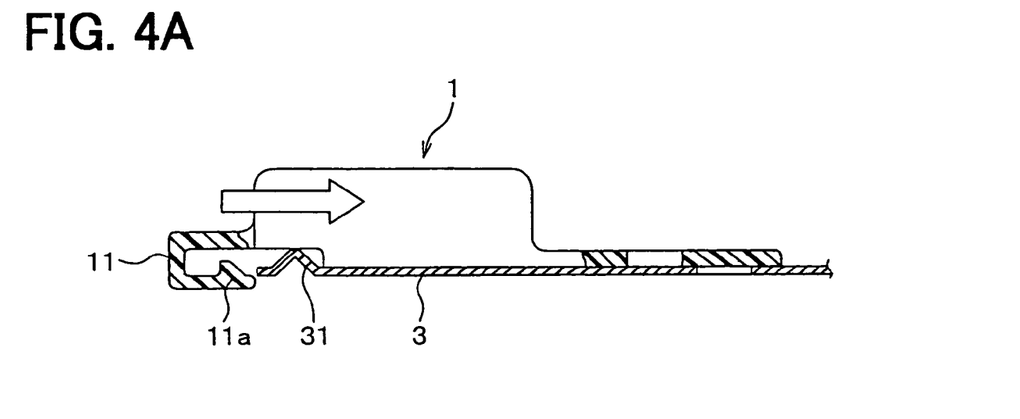
FIG. 4A is a cross-sectional view showing a first step of the installation of the radio communication module on the license plate.
Figure 4B:
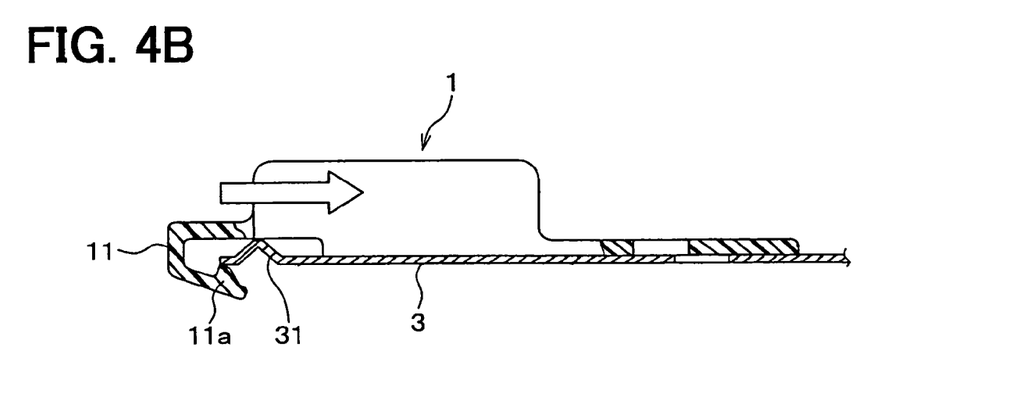
FIG. 4B is a cross-sectional view showing a second step of the installation of the radio communication module on the license plate.
Figure 4C:
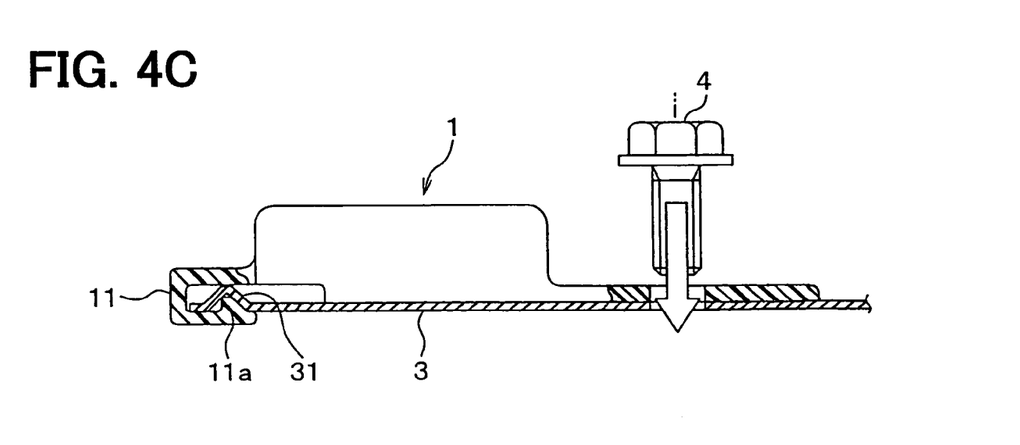
FIG. 4C is a cross-sectional view showing a third step of the installation of the radio communication module on the license plate.

In the following is described an installation method of the radio communication module 1 on the license plate 3 of the vehicle wire references to FIGS. 3A, 3B and 4A to 4C. FIG. 3A depicts a state before the installation of the radio communication module 1, and FIG. 3B depicts a state after the installation. FIGS. 4a to 4c depict sectional views of the radio communication module 1 and the license plate 3 in a first to third steps of the installation. The radio communication module 1 is fixed on the license plate 3 in advance of fixing the license plate 3 on the vehicle.

At first, as indicated by arrows in FIGS. 3A, 4A and 4B, the radio communication module 1 is slid on the license plate 3 in a direction to align the fixing hole 13 of the radio communication module 1 with the installation hole 32 of the license plate 3. Then, as shown in FIGS. 4A and 4B, the engaging hook 11a of the first engaging portion 11 climes over the left end portion of the license plate 3.

Then, as shown in FIG. 3B, the radio communication module 1 is kept slid on the license plate 3 until the fixing hole 13 of the license plate 1 aligns with the installation hole 32 of the license plate 3. Then, as shown in FIG. 4C, the first engaging portion 11 pinches the ridge 31 of the license plate 3, and the engaging hook 11a of the first engaging portion 11 enters into the rear side of the ridge 31 of the license plate 3 to be engaged with the ridge 31.

In the same manner, the second engaging portion 12 pinches the ridge 31 of the license plate 3, and the engaging hook 12a of the second engaging portion 12 engages with the rear side of the ridge 31 of the license plate 3.

Then, the bolt 4 is inserted into the fixing hole 13 of the radio communication module 1 and the installation hole 32 of the license plate 3, and the bolt 4 is screwed into the vehicle to fasten the radio communication module 1 and the license plate 3 integrally to the vehicle.

As described above, the first and second engaging portions 11, 12 engage with the end portions of the license plate 3 just by sliding the radio communication module 1 on the license plate 3 in a direction from the top-left side to a center portion of the license plate 3 to improve a workability in fixing the installation of the radio communication module 1.

Figure 5A:
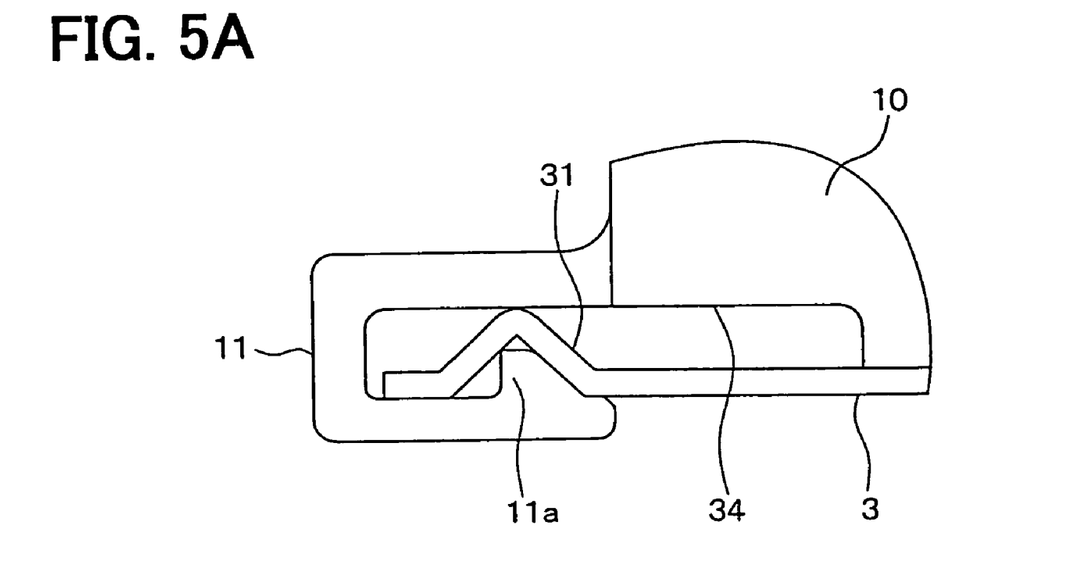
FIG. 5A is an enlarged cross-sectional view showing a state before a detachment of the radio communication module according to the first embodiment from the license plate.
Figure 5B:
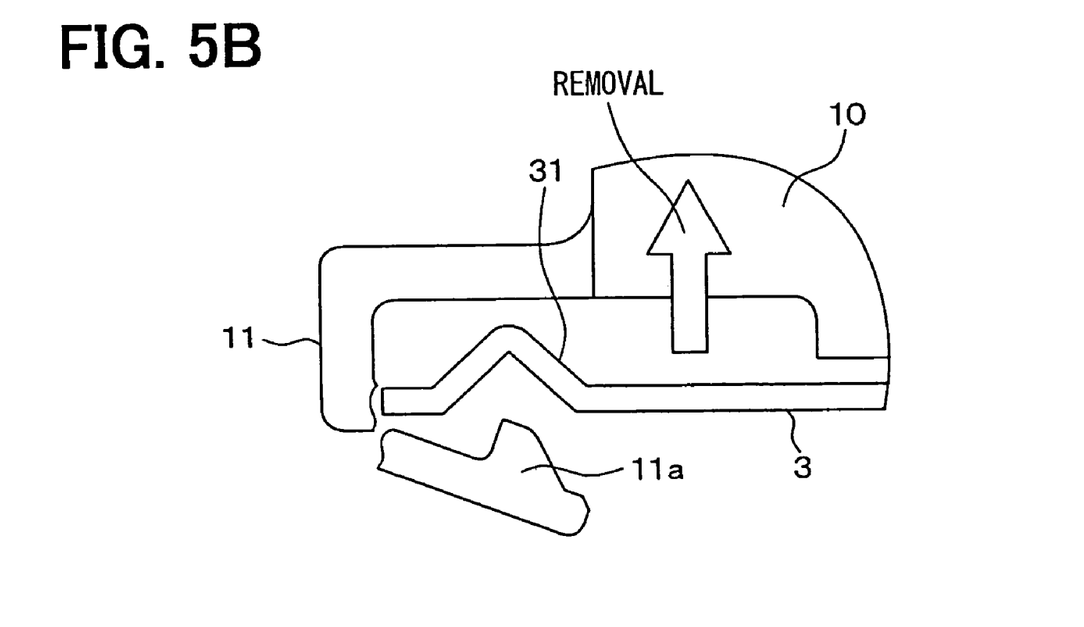
FIG. 5B is an enlarged cross-sectional view showing a state after the detachment of the radio communication module according to the first embodiment from the license plate.

Next, in the following is described a detachment of the radio communication module 1 from the license plate 3 of the vehicle wire references to FIGS. 5A and 5B. FIG. 5A depicts a state before the detachment of the radio communication module 1, and FIG. 5B depicts a state after the detachment.

As shown in FIG. 5A, in a state that the engaging hook 11a of the first engaging portion 11 is engaged with the rear side of the ridge 31 of the license plate 3, the radio communication module 1 is not easily detached from the license plate by the snap-and-fit shape of the engaging hook 11a.

However, after the installation of the radio communication module 1 on the vehicle, a detachment of the radio communication module 1 from the vehicle should be considered for data maintenance, repair of failure of the main unit and so on. In the radio communication module 1 according to the present embodiment, as shown in FIG. 5B, a base portion of the engaging hook 11a of the first engaging portion 11 is shaped thin to be broken when the radio communication module 1 is detached from the license plate 3.

As described above, the radio communication module 1 has a construction such that the engaging hook 11a of the first engaging portion 11 is broken in detaching the radio communication module 1 from the license plate 3, so as to improve a detaching workability of the radio communication module 1.

Further, by the structure such that the engaging hook 11a of the first engaging portion 11 is broken in detaching the radio communication module 1 from the license plate 3, a visual inspection of the broken state of the engaging hook 11a enables to confirm that the radio communication module 1 is unauthorizedly replaced from another vehicle.

A seal structure of a license plate is in practical use such that a seal base is screw-fastened together with a license plate and a seal head is snapped on the seal base for an authorization of the license plate.

Figure 6:
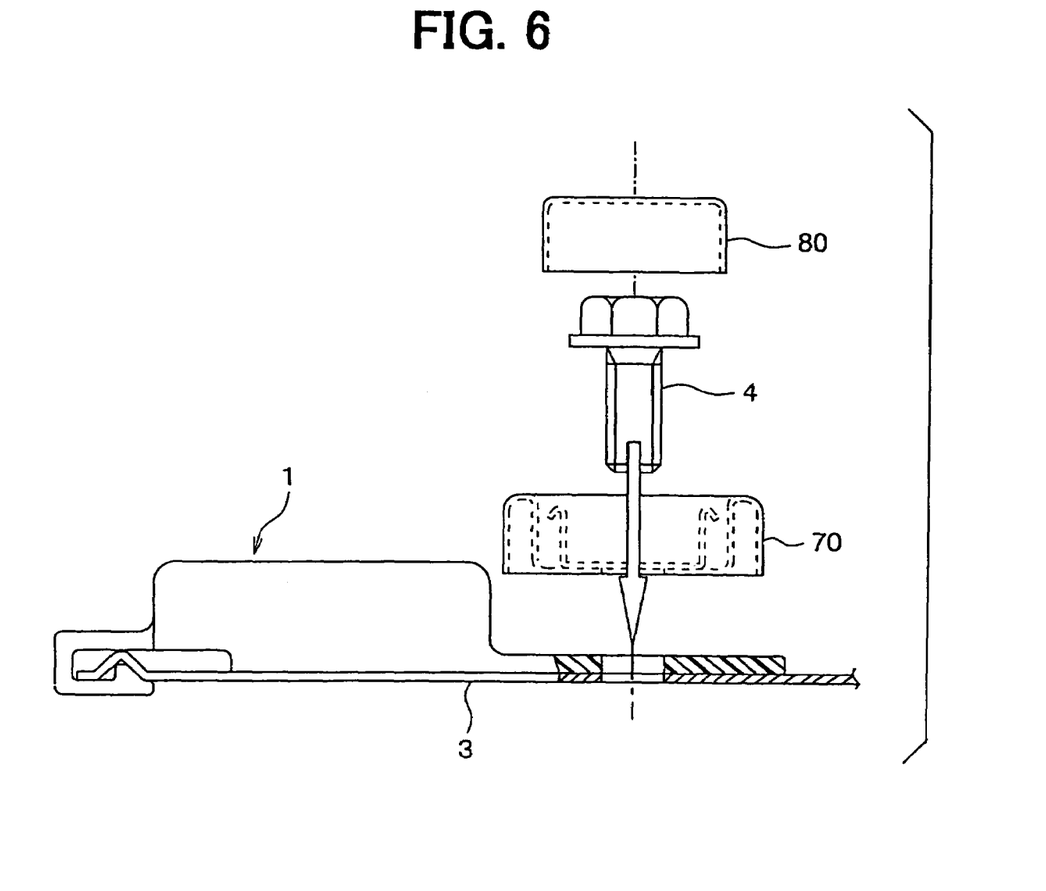
FIG. 6 is a partial side view showing a fixing and sealing method of the radio communication module and the license plate according to the first embodiment.

To fix the radio communication module 1 on the license plate 3 to which the above-described seal structure is applied, as shown in FIG. 6, the radio communication module 1, the license plate 3 and the seal base 70 are integrally screw-fastened to the vehicle, then the seal head 80 is snapped on the seal base 70.

As described above, by screw-fastening the radio communication module 1, the license plate 3 and the seal base 70 integrally and snapping the seal head 80 on the seal base 70, a visual inspection of the state of the seal base 70 and the seal head 80 to confirm whether the radio communication module 1 is unauthorizedly replaced from another vehicle or not, to prevent the radio communication module 1 from being stolen.

As described above, the radio communication module 1 is provided with the housing 10 having the first and second engaging portions 11, 12, which is to be engaged with the end portions of the license plate 3, and the fixing hole 13 through which the bolt 4 is inserted to screw-fasten the license plate 3 to the vehicle. Then, the first and second engaging portions 11, 12 of the housing 10 are engaged with the end portions of the license plate 3, and the bolt 4 inserted into the fixing hole 13 of the housing 10 screw-fastens the radio communication module 1 together with the license plate 3 to the vehicle.

Thus, one bolt 4 can stably screw-fasten the radio communication module 1 and the license plate 3 to the vehicle.

Second Embodiment

Figure 7A:
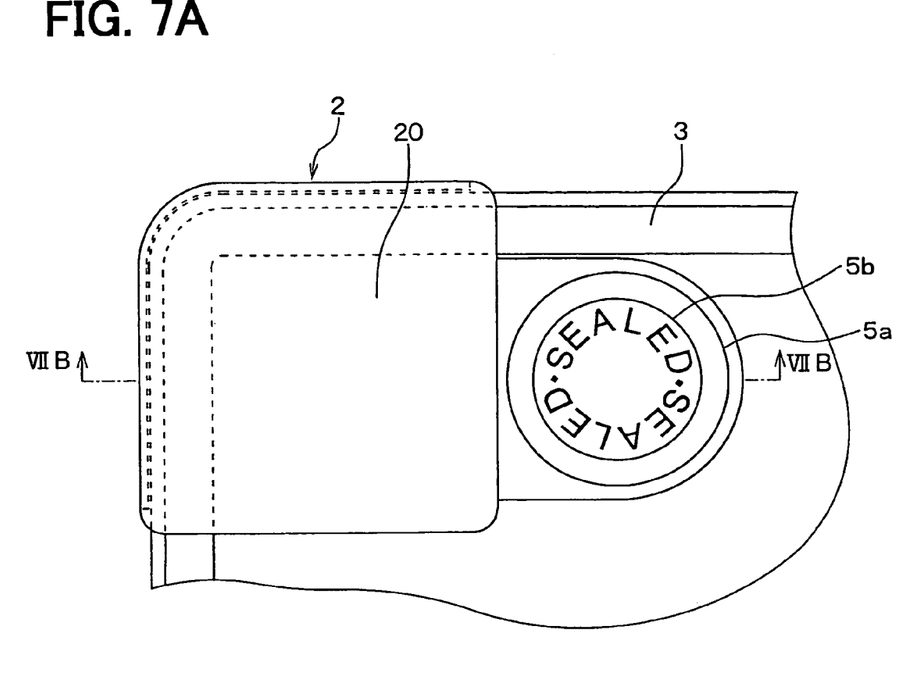
FIG. 7A is a front view showing a fixing state of a radio communication module according to a second embodiment of the present invention.
Figure 7B:
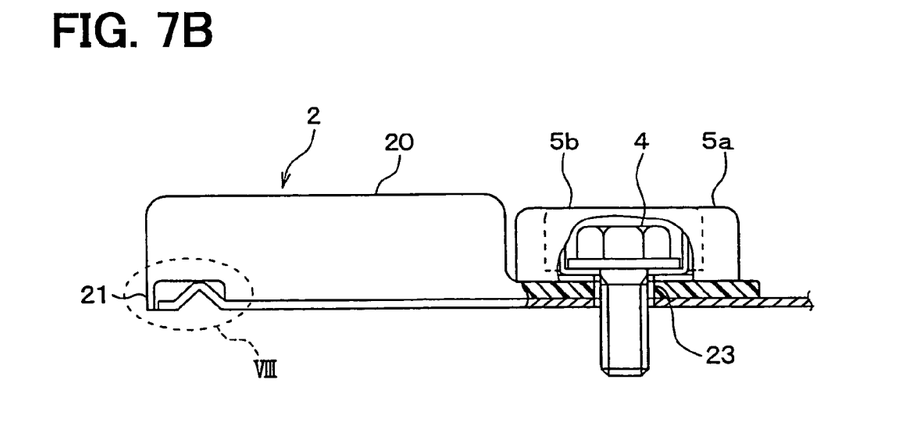
FIG. 7B is a cross-sectional view showing the fixing state of the radio communication module of FIG. 7A taken along the line VIIB-VIIB.
Figure 8:
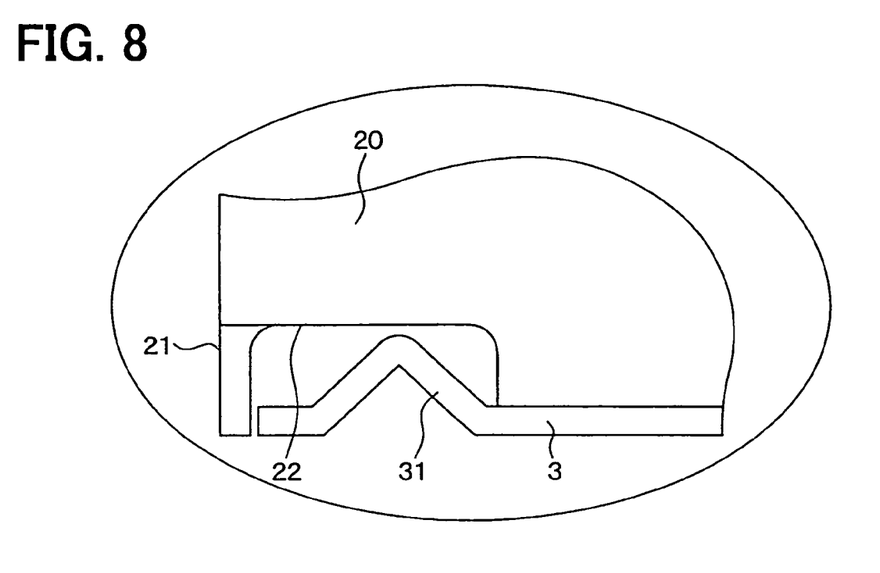
FIG. 8 is an explanatory diagram of a mechanism of a switching plate of the motor apparatus according to the embodiment.

Next, a radio communication module 2 according to a second embodiment of the present invention is described. The same referential numerals are assigned to the components of the radio communication module 2 that are substantially equivalent to those in the first embodiment. In the following is mainly descried a construction of the radio communication module 2 that is different from that in the first embodiment. FIGS. 7A and 7B depict a state that the radio communication module 2 according to the second embodiment is fixed on a top-left portion of the license plate 3 of the vehicle. FIG. 8 is a magnified view of a circled portion VIII in FIG. 7B.

The radio communication module 1 according to the first embodiment, as shown in FIGS. 1A to 1C, is fixed on the license plate 3 by the first and second engaging portions 11, 12 that pinch the ridge 31 at the left and top end portions of the license plate 3, and the bolt 4. The radio communication module 2 according to the second embodiment, as shown in FIGS. 7A and 7B, is fixed on the license plate 3 by a cover portion 21, which covers a side end face of a top-left corner portion of the license plate 3, and the bolt 4.

Figure 9A:
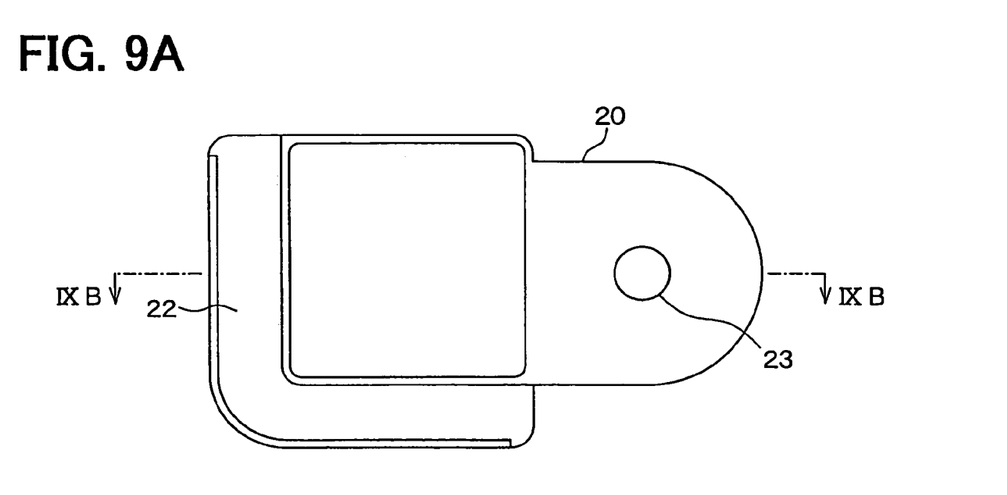
FIG. 9A is a bottom view of the n explanatory diagram of a mechanism of a switching plate of the motor apparatus according to the embodiment.
Figure 9B:
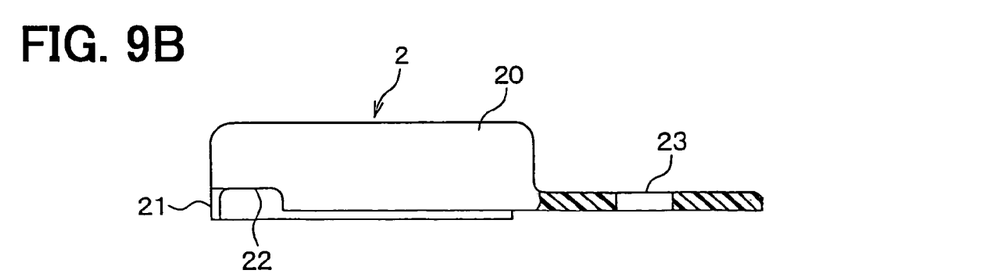
FIG. 9B is an explanatory diagram of a mechanism of a switching plate of the motor apparatus according to the embodiment.

FIG. 9A depicts a rear view of the radio communication module 2, and FIG. 9B is a cross-sectional view of the radio communication module 2 taken along a line IXB-IXB in FIG. 9A.

The radio communication module 2 is provided with a housing 20 made of resinous material, which installs a main body (not shown) of the radio communication module 2 therein.

The housing 20 of the radio communication module 2 has a depressed portion 22, in which the reinforcing ridge 31 of the license plate 3 is installed not to interfere with the housing 20, the cover portion 21, which covers the side end face of the license plate 3, and a fixing hole 23 through which a bolt 4 is inserted to fix the license plate 3 and the radio communication module 2 on the vehicle.

The cover portion 21 is provided in such a manner to cover from the housing 20 to the side end face of the license plate 3. The cover portion 21 has a construction to prevent the radio communication module 2 from being rotationally misaligned.

To fix the radio communication module 2 on the license plate 3, the cover portion 21 is aligned with the top-left corner portion of the license plate 3 to align the fixing hole 23 of the radio communication module 2 with the installation hole 32 of the license plate 3. Then, as shown in FIGS. 7A and 7B, the bolt 4 is inserted into the fixing hole 23 of the radio communication module 2 and the installation hole 32 of the license plate 3, and the bolt 4 is screwed into the vehicle to fasten the radio communication module 2, the license plate 3 and a seal base 5a integrally to the vehicle, and then a seal head 5b is snapped on the seal base 5a.

As described above, the radio communication module 2 has a construction such that the radio communication module 2 is easily fixed on the top-left portion of the license plate 3 by the cover portion 21 and the bolt 4, so as to improve a workability in fixing the installation of the radio communication module 2 is improved. Further, by unscrewing the bolt 4, the radio communication module 2 can be easily detached from the license plate 3, so as to improve a detaching workability of the radio communication module 2.

In the above-described embodiments, the first and second engaging portions 11, 12 and the cover portion 21 correspond to an engaging portion of the present invention.

The present invention is not to be limited to the above-described embodiments, and may be modified along a thought of the present invention.

In the above-described embodiments, the radio communication modules 1, 2 are fixed on the top-left portion of the license plate 3. The radio communication module according to the present invention is fixed not only on the top-left portion of the license plate, but naturally also on a top-right portion of the license plate, for example.

In the above-described embodiments, the housing 10, 20 of the radio communication module 1, 2 are made of resinous material. Alternatively, the housing of the radio communication module according to the present invention may be made of materials other than resinous material, for example, may be made of aluminum and other metals.

In the first embodiment, the first engaging portion 11 is formed to be engaged with the left end portion of the license plate 3 at a side of the fixing hole 13 of the housing 10 in a horizontal direction, so as to fix the radio communication module 1 on the license plate 3 with use of the first engaging portion 11 and the bolt 4. Alternatively, an engaging portion may be formed to be engaged with a top end portion of the license plate 3 at a side of the fixing hole 13 of the housing 10 in a vertical direction, so as to fix the radio communication module 1 on the license plate 3 with use of the engaging portion and the bolt 4.

In the second embodiment, the cover portion 21 covers the side end face of the top-left corner of the license plate 3. Alternatively, similarly to the radio communication module 1 shown in FIGS. 1B and 1C, the cover portion 21 may have an approximately U-shaped sectional shape so that the cover portion 21 pinches the ridge 31 of the license plate 3 therein. Further, similarly to the radio communication module 1 shown in FIGS. 1B and 1C, the cover portion 21 may be provided with an engaging hook having so-called snap-and-fit shape so that the engaging hook engages with the rear side of the ridge of the license plate.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A radio communication module in combination with a license plate of a vehicle, the radio communication module comprising:

a housing having an engaging portion and a fixing hole, the engaging portion extending over an outside rim of the license plate; and a bolt inserted in the fixing hole to screw-fasten the radio communication module together with the license plate to the vehicle.

2. The combination according to claim 1, wherein the engaging portion extends over the outside rim of the license plate at a side of the fixing hole in a horizontal direction.

3. The combination according to claim 1, wherein the engaging portion extending over the outside rim of the license plate at an upper end of the license plate.

4. The combination according to claim 1, wherein the engaging portion sandwiches the outside rim of the license plate between opposing arms.

5. The combination according to claim 1, wherein:
the license plate has a ridge extending outward along the outside rim thereof; and
the engaging portion has an engaging hook to be engaged with a rear side of the ridge.

6. The combination according to claim 5, wherein the engaging hook has a structure to be broken when the radio communication module is detached from the license plate.

7. The combination according to claim 1, wherein the engaging portion has a shape to cover a side end face of a corner portion of the license plate.

8. The combination according to claim 1, wherein the housing is smaller than the license plate.

9. The combination according to claim 1, wherein a circumference of the housing is smaller than a circumference of the license plate.

10. An method of installing a radio communication module on a license plate of a vehicle, the method comprising:
providing the radio communication module with a housing having an engaging portion and a fixing hole;
engaging the engaging portion with a rim of the license plate; and
inserting a bolt into the fixing hole to screw-fasten the radio communication module together with the license plate to the vehicle.

11. The method according to claim 10, wherein the engaging step includes engaging the engaging portion with the rim of the license plate at a side of the fixing hole in a horizontal direction.

12. The method according to claim 10, wherein the engaging step includes engaging the engaging portion with the rim of the license plate at an upper end of the license plate.

13. The method according to claim 10, further comprising pinching the rim of the license plate with the engaging portion.

14. The method according to claim 10 further comprising:
providing the license plate with a ridge extending outward along the rim thereof;
providing the engaging portion with an engaging hook to be engaged with the ridge; and
engaging the engaging hook with a rear side of the ridge.

15. The method according to claim 14, further comprising providing the engaging hook with a structure to be broken when the radio communication module is detached from the license plate.

16. The method according to claim 10, further comprising providing the engaging portion with a shape to cover a side end face of a corner portion of the license plate.

17. The method according to claim 10, further comprising sizing the housing smaller than the license plate.

18. The method according to claim 10, further comprising sizing a circumference of the housing smaller than a circumference of the license plate.

* * * * *